March 29, 1960  H. E. KREIDER  2,930,625
MANURE SPREADER AND BEATER
Filed April 27, 1959

INVENTOR
HENRY E. KREIDER

BY Watson, Cole, Grindle & Watson
ATTORNEY

United States Patent Office 2,930,625
Patented Mar. 29, 1960

2,930,625

MANURE SPREADER AND BEATER

Henry Ethan Kreider, Lebanon, Pa.

Application April 27, 1959, Serial No. 808,984

14 Claims. (Cl. 275—6)

This invention relates to improvements in a manure spreader and beater, and has to do more particularly with the structural adaptation of a more or less conventional manure spreader in a manner to enable the effective retention of the usual liquids in the manure as the spreader box is loaded, while it is standing and or while en route to the area where its contents are to be discharged, all to the end that the liquids may be eventually discharged onto the ground together with the remaining components of the manure thereby contributing substantially to the quality of the manure as a fertilizing agent.

The value of the liquid components of animal manure for fertilizing purposes have long been appreciated. Moreover many attempts have been made in the past to provide an effective means for retaining such liquid contents in the manure while the latter is conveyed to the desired area and scattered in usual manner thereover. All such means heretofore devised however have involved either tank-like structures incapable of efficiently handling the solid components of the manure, or else have resulted in extensive structural modifications of the spreader, usually directed toward the provision therein of a liquid collecting tank or reservoir.

The present invention however merely involves a minor modification of the structure of any conventional manure spreader and is applicable to such spreaders of varying makes and models, whether driven from ground wheels or from a power takeoff on the tractor which furnishes the motive power for same.

To this end the present invention consists primarily in modification of the structure of the conventional lower beater at the discharge end of the spreader box. The modification is such as to make it possible for the beater structure to be brought to rest in a predetermined position of rotation to close the normally open discharge end of the spreader box against the escape of any appreciable amount of fluids. At the same time the modified beater is so arranged that it may be rotated by usual drive means to perform its usual function of dividing and scattering the spreader contents.

More specifically the aforesaid modification consists in applying to the lower beater of the spreader a flap of flexible material having a free edge portion normally tending to project radially from the beater to be positioned in substantial sealing relation with the sides and bottom of the wagon box when the beater is brought to rest in a predetermined position.

Where the beater is of conventional open construction comprising a plurality of toothed bars supported in relatively spaced cylindrical conformation, a portion of the flap remote from its said free edge may be secured circumferentially partly around the beater and between adjoining bars to prevent the escape of fluid between these bars. By this means the flap may be made to function as a dam at the normally open rear end of the wagon box for a height coextensive at least with the diameter of the beater.

Moreover the flap is so arranged in the preferred embodiment of the invention as to avoid interference with the primary function of the beater, namely its function of disintegrating large masses or cakes of the manure and delivering it either onto the ground or on to a usual wide spread attachment. To this end the flap of stiffly flexible material may extend normally in a generally tangential direction to project radially beyond the outermost ends of the teeth of the beater for engagement with the floor of the spreader wagon box to therewith form an effective liquid seal. However in order to prevent the said flap from being projected or swung radially outwardly to an undesired extent such as might cause it to interfere with the action of the beater or to become subjected to wear at an unnecessarily fast rate, the free end portion of the flap is normally resiliently urged toward the rotational axis of the beater by suitable spring means.

In addition to the modified spreader in its entirety, my invention also includes the advantageously modified lower beater as a patentably new and useful article of manufacture.

The presently preferred embodiment of the invention as illustrated in the accompanying drawings in which.

Figure 1:
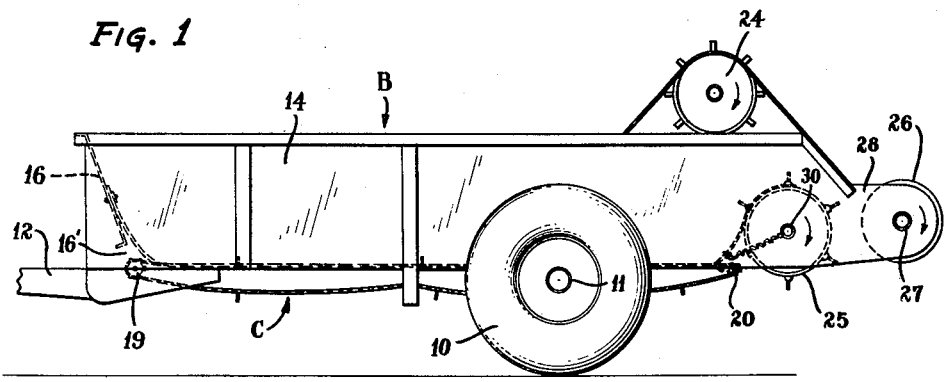
Figure 1 is a side elevation of a more or less conventional manure spreader modified in accordance with my invention.

Referring now to the accompanying drawings the manure spreader to which the invention is applied is of the generally conventional type including a wagon box generally designated B which is supported for ground traversing movement on usual ground wheels 10 carried by a cross axle 11. At its forward end the wagon box B is provided with a usual draft tongue 12, shown fragmentarily in Figure 1. Such a draft tongue is adapted for coupling to the draw bar of a tractor whereby the front end of the wagon box is supported by the draw bar and the wagon box in its entirety is drawn forward by the tractor. The wagon box itself includes the usual horizontal bottom or floor 13 together with upstanding parallel sides 14 and 15 and the front end wall 16.

The lower edge of the front end wall 16 terminates in slightly spaced relation above the level of the bottom 13 in order to permit movement into the wagon box and along the bottom 13 of a usual cross-slat conveyer, designated C in its entirety. The conveyer C includes laterally opposed endless chains 17 and a series of cross slats 18 respectively extending between and connected to the respective chains, the slats 18 being disposed at suitable intervals along the length of the chains for sweeping movement over the surface of the floor or bottom 13. In the embodiment of the invention illustrated the upper run of the conveyer C thus sweeps over the bottom 13 from front to rear to carry the wagon box contents toward the normally open rear end of the wagon box for discharge.

It will be seen that the chains 17 are each supported at the front end around a sprocket 19 and at the rear end around a sprocket 20. The conveyer C may be selectively driven or permitted to remain inoperative. The drive is derived in usual manner either through power take off from the tractor or from the ground wheels 10 through usual manually controllable mechanism. The particular mechanism employed for driving the conveyer C is in any event purely conventional and constitutes no part of the present invention, hence is not specifically illustrated herein. However such mechanism may be of the form exemplified in the Hybbert U.S. Patent No. 2,478,583 of Sept. 9, 1949.

In order to prevent any appreciable leakage of the liquid contents of the wagon box through the gap 16' beneath the lower edge of the front end 16, there is provided in conventional manner a sealing flap 21 of a flexible generally fluid tight fabric such as heavy canvas or canvas belting. The sealing flap 21 is preferably in the form of a rectangular strip coextensive in length with end wall 16 and having its upper edge portion secured to this end wall above the gap 16' as by means of the clamp bar 22 and bolts 23. The lower end portion of the flap 21 extends across the gap 16' and into substantial sealing engagement with the wagon box bottom 13. In actual practice the conveyer chains 17 and slats 18 may run beneath this flap 21 without permitting any appreciable leakage of fluid therethrough.

Disposed for rotation across the normally open discharge end of the wagon box are upper and lower beaters 24 and 25 respectively which, during the discharging operation function in usual manner to disintegrate and scatter the material delivered thereto by the operative upper run of the conveyer C and to deliver the disintegrated material to a usual rotary wide spread attachment 26, the shaft 27 of which is rotatably supported between rearward extensions 28 of the wagon box sides. Rotation may be imparted to the widespread attachment 26 by usual drive means housed within the casing or housing 29 shown in Figure 2.

The upper and lower beaters 24 and 25 are both driven by conventional mechanisms of the type which may be actuated to permit the drive to be commenced or discontinued at will, regardless of whether the spreader is at rest or in transit. Such drive mechanisms and in fact the entire structure and its mode of operation as thus far described is old and well known in the art and constitutes no part of the present invention. The drive mechanisms per se may be similar to those disclosed in the U.S. patents to Neighbour 2,657,583 and/or to Oppenheim et al. 712,581.

As has been heretofore pointed out the present invention consists particularly in the specific construction of the lower beater 25 and its mode of cooperation with the floor 13, conveyer C and side walls 14 and 15 at the discharge end of the spreader box to seal off this discharge end against the escape of any appreciable amount of liquid when the beater 25 is brought to rest in a predetermined rotational position. The lower beater here illustrated is in a large part of conventional construction, comprising a usual rotatably mounted and driven shaft 30 journaled across the rear discharge end of the wagon box between the two sides 14 and 15 thereof. Fixed on this shaft 30 are relatively axially spaced discs or spiders 31—31 having peripheral cylindrical flanges 32. Fixedly secured to these flanges 32 are toothed bars 33 arranged preferably at regular angular intervals around the peripheries of the spiders and extending substantially completely across the discharge end between the side walls 14 and 15.

Figure 4:
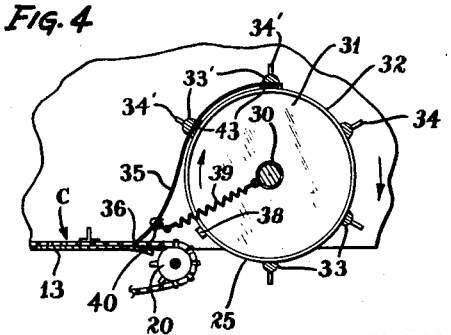
Figure 4 is an enlarged fragmentary section on the line 4—4 of Figure 2.

It will be seen that the radially outer ends of the teeth 34 carried by such bars all lie on a common imaginary cylinder just above and to the rear of the discharge end of the floor 13 and, as indicated by the arrows in Figures 1 and 4, the lower beater 25 is rotated in a direction such that its lower periphery moves in a direction opposite to the feeding or discharge movement of the conveyer C. Thus the manure fed rearwardly by the conveyer C across the floor 13 is picked up and disintegrated by the teeth 34 in usual manner while being delivered onto the wide spread attachment 26.

Fixed to and carried by the lower beater 25 is a flap of stiffly resilient material such as canvas belting or the like, said flap being designated 35 in its entirety. It will be seen that the length of the flap from its connection to the beater 25 is sufficient to permit the free end edge 36 of the flap to project radially outwardly beyond the cylinder of revolution defined by the outer ends of the teeth 34 and into substantially sealing engagement with the upper surface of the floor 13 when the beater 25 is brought to rest in the rotational position illustrated in Figure 4. Because of this and because of the fact that the flap 35 is proportioned to extend completely across the discharge end of the wagon box and preferably into wiping engagement with the opposite sides 14 and 15 thereof, it will be seen that the flap 35 when positioned as shown in Figure 4 will function effectively to form a dam at the discharge end of the wagon box for preventing the escape of any appreciable amount of the fluid contents from the manure therewithin.

Obviously the exact manner of securing the flap 35 to the beater 25 may vary considerably within the scope of the invention and moreover certain obvious variations in the manner of application will be required in order to suitably adapt the invention for incorporation in beaters of varying constructions. Where the beater is of the open cylindrical type comprising the supporting disks 31 and toothed angularly spaced bars 33 and 33' as here illustrated, there may be interposed beneath one or more of the toothed bars 33' a clamping bar 36. The material of the flap 35 may be thus clamped between each cooperating pair of bars 36'—36 by means of usual bolts 37.

Where the bars 33' are those of a conventional beater, their teeth 34' will preferably be shortened sufficiently to permit them to lie on the same imaginary cylindrical surface as the ends of the teeth 34. Also where the beater 25 is formed by modification of an existing conventional beater it is desirable to remove one of the toothed bars and to replace this with a plain bar 38 from which teeth are omitted in order to avoid interference with radially inward movement with the flap 35 and possible damage thereto.

Moreover since the rotation of the beater 25 will normally tend to exert on the flap 35 a centrifugal force tending to urge it radially outwardly, it is desirable to provide suitable spring means 39 interconnected between the free end of the flap 35 and the axle 30 to resiliently resist this centrifugal force. Preferably the flap 35 is stiffened adjacent its free edge 36 by means of a stiffening bar 40 secured thereto and this bar 40 may provide a convenient anchorage point for the several springs 39.

Figure 2:
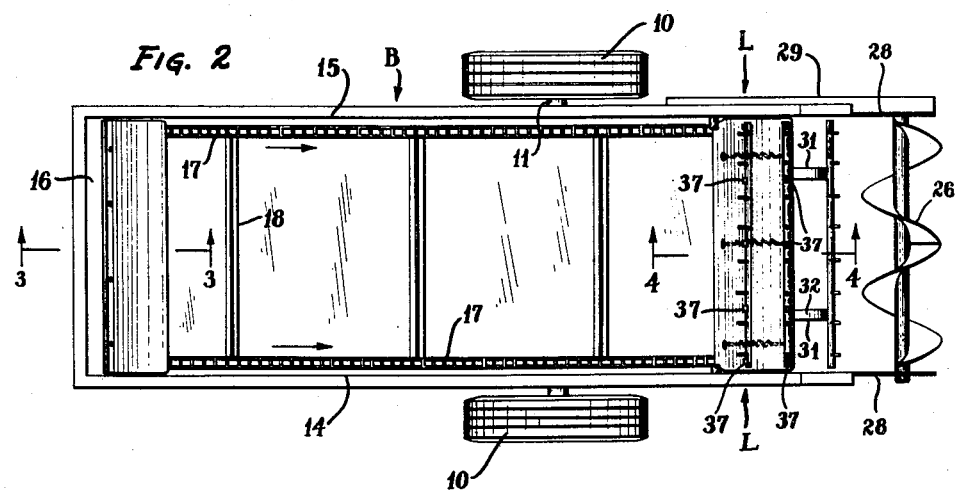
Figure 2 is a planned view of the modified spreader shown in Figure 1.
Figure 3:
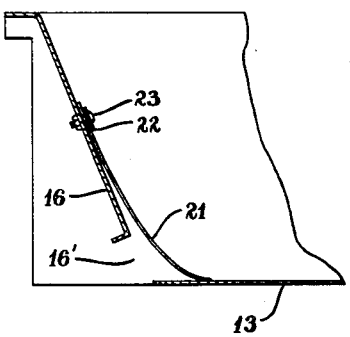
Figure 3 is an enlarged detail section on the line 3—3 of Figure 2.

In the preferred application of the flap 35 to the beater structure as illustrated in detail in Figure 4, the flap is fixedly secured to the beater along the line L—L in Figure 2 beneath and coincident with the beater bar 33' immediately adjacent to the free portion of the flap 35. Therefore the flap 35 normally extends generally tangentially from its line L—L of attachment to its free outer end edge 36 when in engagement with the floor or bottom of the wagon box as shown in Figure 4. However the flexible material of the flap 35 permits it to be curved generally concentrically to the curvature of spiders 25 until it engages the cross bar 38 which functions as a stop. Thus the flap 35 is permitted to yield inwardly under the pressure of the wagon box contents when the beater is rotating and in this function is assisted by the spring 39.

In order that the flap 35 may function as a liquid retaining dam capable of retaining the greatest possible depth of liquid within the wagon box, it preferably extends from the line of attachment L—L in a direction remote from the free edge 36 circumferentially around the beater to such an extent that the upper end extremity of the flap is located at a level approximately at the top of the beater in its stationary position. To this end the flap 35 circumferentially around the beater structure and is clamped between adjoining sets of bars 43 and 33' as shown in Figure 4.

In the operation of the invention, prior to commencement of the loading of manure into the wagon box, the beater 25, after having its rotary drive mechanism released whereby it may remain stationary, is manually or otherwise reversely rotated in the direction in which its free end edge 36 extends, to the extent necessary to bring such end edge into operative engagement with the floor 13 of the wagon box between adjoining conveyer slats 18 in the position substantially as shown in Figures 1 and 4.

After the wagon box has been fully loaded, the same may be transported to the site where it is desired to commence to discharge of its contents. During the transport the drive mechanisms for both the conveyer C and the upper and lower beaters 24 and 25 respectively will be maintained disengaged in usual manner to avoid discharge of the contents. During this period the flap 35 will remain stationary to function as a dam across the discharge end of the wagon box and to efficiently prevent the unintentional discharge of fluid content from the wagon. It will be apparent that the flap 21 at the forward end of the wagon box will function at all times to resist the escape of the liquid contents of the box through the slot 16' at the forward end of the box.

When it is desired to commence discharge of the wagon box contents it is necessary only to initiate the rotation of the beaters 24 and 25 and the feeding movement of the conveyor C in conventional manner. Rotation of the beater 25 in the direction of the arrows as shown in Figures 1 and 4, will immediately withdraw the flap 35 from its operative position and, during continued rotation, the flap 35 may yield radially inwardly toward the axis 30 about which the beater rotates to avoid any appreciable interference with the shredding action of the radially projecting beater teeth 34.

Thus the arrangement will be such that the manure will be discharged and distributed in a form wherein substantially all of its original liquid content has been preserved for application to the soil together with the solid content.

Moreover it will be apparent that rotation of the beater 25 and flap 35 will play a definite part in the distribution of any free liquid content since any free liquid discharged onto the flap as it passes upwardly through the discharge end of the wagon box will be flung off in droplets by centrifugal force.

It will further be seen that retention of the liquid content in the manure will tend to increase the fluidity of the mass of manure as a whole, whereby it will offer less resistance to the beater rotation than is the case in usual spreaders wherein the liquid content is in a large part lost by leakage. Because of this fact it has been found in actual practice that less power is consumed for the purpose of rotating the beaters than is the case in conventional spreaders of similar capacity. In fact it has been found that application of the invention to a conventional and commercially available form of manure spreader has resulted in a marked reduction of the power requirements for operation of such a spreader.

A further incidental benefit obtained by the invention consists in a very appreciable reduction of the winding of loose bailer twine or wire or other stringy material around the lower beater such as ordinarily occurs.

In this application I have shown and described simply the preferred embodiment of the invention. However I recognize that my invention is capable of other and different embodiments, and that its several details may be modified in various ways, all without departing from my invention. Accordingly the drawing and description herein are to be construed as merely illustrative in nature and not as restrictive.

Having thus described my invention I claim:

1. In a manure spreader of the class wherein the manure is supported on the bottom of a wagon box having parallel upstanding sides, and conveyed to the discharge end of said box by a conveyer moving over said bottom between said sides, the combination with said manure spreader of a beater mounted at the discharge end of said bottom for rotation about an axis above and parallel to said bottom, a flap of stiffly resilient material secured to said beater, said flap having a free end edge disposed parallel to said bottom and spaced radially outwardly from the surface of revolution defined by said beater for substantial sealing engagement with said bottom in a predetermined rotational position of said beater.

2. The combination of claim 1 wherein said flap extends completely across the discharge end of said box between its sides to function as a fluid retaining dam when the beater is maintained stationary in said predetermined rotational position.

3. In a manure spreader of the class where the manure is supported on the bottom of a wagon box having parallel upstanding sides, and conveyed to the discharge end of said box by a conveyer moving over said bottom between said sides, the combination with said manure spreader of a beater mounted at the discharge end of said bottom for rotation about an axis above and parallel to said bottom, said beater having radially projecting teeth thereon, a flap of stiffly resilient material secured to said beater radially inwardly of the outer ends of said teeth, said flap having a free end edge disposed parallel to said bottom and spaced radially outwardly from the surface of revolution defined by the outer ends of said teeth for substantial sealing engagement with said bottom in a predetermined rotational position of said beater, said flap extending completely across the discharge end of said box between its sides to function as a fluid retaining dam in said predetermined position.

4. In a manure spreader of the class wherein the manure is supported on the bottom of a wagon box having parallel upstanding sides and conveyed to the discharge end of said box by a cross slatted conveyer moving over said bottom between said sides, the combination with said manure spreader of a beater mounted at the discharge end of said bottom for rotation about an axis above and parallel to said bottom, said beater having radially projecting teeth thereon, a flap of stiffly resilient material secured to said beater along a line of attachment parallel to such axis and radially inwardly of the free ends of said teeth, said flap projecting from its said line of attachment and having a free end edge disposed parallel to said bottom and spaced radially outwardly from the surface of revolution defined by said line of attachment to extend between adjoining slats of the conveyor for substantial sealing engagement with said bottom in a predetermined rotational position of said beater, said flap extending completely across the discharge end of said wagon box between its sides to function as a fluid retaining dam in said predetermined position.

5. The combination defined in claim 4 wherein said flap includes a portion on the remote side of said line of attachment from its said free end edge, said portion extending circumferentially partially around the beater and radially inwardly of the outer ends of said teeth.

6. In a manure spreader of the class wherein the manure is supported in the bottom of a wagon box having parallel upstanding sides, and conveyed to the discharge end of said box by a cross slatted conveyer moving over said bottom, the combination with said manure spreader of a rotary beater mounted over the discharge end of said bottom for rotation, a flap of stiffly flexible material secured to said beater along a line generally parallel to the rotational axis of the beater, said flap having a free end edge spaced radially outwardly from the surface of revolution defined by said beater, said edge extending parallel to said box bottom for substantial sealing engagement therewith in a predetermined rotational position of the beater, said flap extending completely across the wagon box between the sides thereof.

7. In a manure spreader of the class wherein the manure is supported in the bottom of a wagon box having parallel upstanding sides, and conveyed to the discharge end of said box by a cross slatted conveyer moving over said bottom, the combination with said manure spreader of a rotary beater mounted over the discharge end of said bottom for rotation in a direction such that its lower periphery moves oppositely to the discharge movement of the conveyer, a flap of stiffly flexible material secured to said beater along a line generally parallel to the rotational axis of the beater, said flap having a free end edge spaced radially outwardly from the surface of revolution defined by said beater, said flap extending normally from its line of attachment in a direction opposite to the rotation of the beater, said free end edge extending parallel to the box bottom for substantial sealing engagement therewith in a predetermined rotational position of the beater.

8. The combination of claim 7 wherein said beater comprises a plurality of axially extending angularly spaced toothed beater bars and a pair of spiders supporting said bars in substantially cylindrical conformation, said flap being secured to the beater beneath one of said bars and normally projecting in a generally tangential direction from said bar.

9. The combination defined in claim 8 wherein the flap includes a portion extending between relatively adjoining bars in a generally circumferential direction around the cylinder and secured to the said beater radially inwardly of said bars.

10. In a manure spreader a rotary beater comprising a pair of axially spaced spiders, a plurality of axially parallel bars secured to the periphery of said spiders at spaced intervals therearound in generally cylindrical conformation, a plurality of radially outwardly projecting teeth carried by each said bar, a flap of stiffly flexible material secured to one said bar inwardly of the outer ends of the teeth thereof and having a free end edge normally projecting radially outwardly beyond the rotational path defined by the outer ends of the teeth of said bars.

11. The combination of elements defined by claim 10 wherein said flap includes a portion extending in a generally circumferential direction around the beater and secured between relatively adjoining bars to prevent the escape of fluid between said bars.

12. The combination of elements defined in claim 10 wherein said flap includes adjacent its free end edge a stiffening bar secured to said flap parallel to its said free end edge, and spring means urging said flap radially inwardly relative to said rotary beater.

13. The combination of elements defined in claim 10 including spring means interconnected between said flap and said beater for resiliently urging said flap inwardly toward the rotational axis of the beater.

14. The combination defined in claim 1, wherein said flap extends completely across the discharge end of said box between its sides to function as a fluid retaining dam when the beater is maintained stationary in its predetermined rotational position, including a stiffening bar secured to and extending across said flap adjacent said free end edge of the flap and parallel thereto, and spring means interconnected between said stiffening bar and the beater for resiliently urging said flap radially inwardly toward the beater axis.

References Cited in the file of this patent
UNITED STATES PATENTS

| | | |
|---|---|---|
| 2,699,949 | Neighbour | Jan. 18, 1955 |
| 2,711,902 | Martin | June 28, 1955 |
| 2,885,209 | Bruecker | May 5, 1959 |